United States Patent
Kato et al.

(10) Patent No.: US 7,234,235 B2
(45) Date of Patent: Jun. 26, 2007

(54) WIRE PROCESSING METHOD OF CROSS-LINKING COATED WIRE

(75) Inventors: Tatsuya Kato, Shizuoka-ken (JP); Masashi Kando, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/356,595

(22) Filed: Feb. 3, 2003

(65) Prior Publication Data
US 2003/0145455 A1 Aug. 7, 2003

(30) Foreign Application Priority Data
Feb. 6, 2002 (JP) ............................ P2002-029712
Feb. 6, 2002 (JP) ............................ P2002-029868

(51) Int. Cl.
*H01R 43/00* (2006.01)
*H05K 13/00* (2006.01)

(52) U.S. Cl. .................. 29/854; 29/564.4; 29/745; 29/825; 29/879; 34/403; 34/408; 75/10.14; 75/403; 427/521

(58) Field of Classification Search ................ 29/854, 29/564.4, 745, 825, 879; 427/521; 34/403, 34/408; 75/10.14, 403
See application file for complete search history.

(56) References Cited

U.S. PATENT DOCUMENTS

| | | | | |
|---|---|---|---|---|
| 3,535,482 A | * | 10/1970 | Kluck | 219/687 |
| 3,551,199 A | * | 12/1970 | Forster | 427/521 |
| 5,060,395 A | * | 10/1991 | Pepin | 33/735 |
| 5,505,008 A | * | 4/1996 | Hugo et al. | 34/403 |
| 5,958,323 A | * | 9/1999 | Mio et al. | 264/402 |
| 6,175,095 B1 | * | 1/2001 | MacDonald et al. | 219/121.43 |

FOREIGN PATENT DOCUMENTS

| | | |
|---|---|---|
| JP | 7-214557 | 8/1995 |
| JP | 10-67018 | 3/1998 |

* cited by examiner

*Primary Examiner*—A. Dexter Tugbang
*Assistant Examiner*—Tim Phan
(74) *Attorney, Agent, or Firm*—Finnegan, Henderson, Farabow, Garrett & Dunner, L.L.P.

(57) ABSTRACT

In wire cross-linking process, after microwave is launched into the inside of the waveguide coaxial converter, the coated wire is inserted into the wire insertion pipe. The coated wire is cross-linked by high frequency heat and a coating insulator is adhered well to an electric conductor by heat shrinking.

3 Claims, 6 Drawing Sheets

WIRE PROCESSING METHOD OF CROSS-LINKING COATED WIRE

CROSS REFERENCE TO RELATED APPLICATION

This application claims benefit of priority under 35 U.S.C. § 119 to Japanese Patent Application No. 2002-029712, filed on Feb. 6, 2002, and Japanese Patent Application No. 2002-029868, filed on Feb. 6, 2002, the entire contents of which are incorporated by reference herein.

BACKGROUND OF THE INVENTION

1. Field of the Invention

The present invention relates to a wire processing apparatus and a wire processing method for separating and recovering an electric conductor from a coated wire and for heating a coated wire to cross-link a coating insulator and adhere well the coating insulator to an electric conductor by heat shrinking.

2. Description of the Related Art

In present technical state, most of coated wires such as wire harnesses are not recycled. However, in order to encourage resource conservation and reduce load applied to environment, it is important to recycle the coated wires. As a technique allowing us to recycle a coated wire, there exits a peeling process to peel off a coating resin from a coated steel pipe. The peeling process is disclosed in Japanese Patent Application Laid-Open No. 7-214557. In the peeling process, high frequency dielectric heat is applied to the coated steel pipe, and the coating resin having coated a surface of the steel pipe is heated to a melting point or higher. Thereby, an inner layer portion of the coating resin is brought into a molten state, and an outer layer portion of the coating resin is brought into a softened state. Under such a state, the coating resin is peeled off from the steel pipe.

If the conventional peeling process is applied to the coated wire for recycling an electric conductor, however, since the electric conductor without the coating insulator is recovered in its linear shape, it is necessary to again form the electric conductor into a predetermined shape after the peeling process. There is an adverse possibility that the electric conductor is deteriorated, if the electric conductor is reheated in order to form it into the predetermined shape. Therefore, the peeling process is not suitable technique to recycle the electric conductor. For this reason, it is not possible to recover the electric conductor efficiently in a suitable state for recycling it by separating the coated wire into the electric conductor and the coating insulator by means of the peeling process.

In another present technical state, as a technique allowing us to cross-link a coating insulator and adhere well the coating insulator to an electric conductor, there exits a cross-linking process to cross-link a rubber arranged on a mandrel by means of high frequency heat in order to produce a tight rubber hose. The cross-linking process is disclosed in Japanese Patent Application Laid-Open No. 10-67018. In the cross-linking process, a rubber is arranged on a mandrel having a dielectric layer therein, and high frequency is applied to the dielectric layer in the mandrel to heat the rubber arranged on the mandrel, which cross-links the rubber so as to produce a tight rubber hose.

If the conventional cross-linking process is applied to the coated wire, however, since the cross-linking process normally employs large-scale installation as high frequency applied means, a wire processing apparatus also becomes large size. In addition, in the patent application document, it is not concretely described to apply the high frequency to the mandrel.

SUMMARY OF THE INVENTION

It is an object of the present invention to provide a compact wire processing apparatus and a wire processing method capable of efficiently separating a coated wire into a coating insulator and an electric conductor simultaneously and recovering the electric conductor in a state suitable for recycling it, and it is another objection of the present invention to provide a compact wire processing apparatus and a wire processing method capable of efficiently cross-linking a coating insulator continuously and adhering well the coating insulator to an electric conductor.

To achieve the above object, there is provided a wire processing apparatus comprising a microwave generator for generating microwave, a waveguide for propagating microwave output from the microwave generator in a transmitting space thereof, the waveguide connected to the microwave generator and a wire insertion pipe for inserting a coated wire into the interior thereof, the wire insertion pipe disposed in the transmitting space of the waveguide.

According to the present invention, in a case that the wire processing apparatus is applied to wire recycling process, after a tip end of the coated wire is inserted into the wire insertion pipe, microwave is launched into the inside of the waveguide. Thereby, the tip end of the coated wire is separated into a decomposed coating insulator and a molten electric conductor by microwave. In another case that the wire processing apparatus is applied to wire cross-linking process, after microwave is launched into the inside of the waveguide, the coated wire is inserted into the wire insertion pipe. Thereby, the coated wire is cross-linked by high frequency heat and a coating insulator is adhered well to an electric conductor by heat shrinking.

In a preferred embodiment of the invention, the wire processing apparatus further comprises a short plunger disposed in a terminal end position of the transmitting space of the waveguide, wherein the short plunger includes a movable plate, a rod connected to the movable plate and a fine adjuster adjusting a length of the rod.

According to this embodiment, by adjusting the length of the rod by means of the fine adjuster to change a position of the movable plate, the wire insertion pipe can be easily moved to a desired position within a predetermined range.

In a preferred embodiment of the invention, by adjusting the length of the rod by means of the fine adjuster to change a position of the movable plate, the wire insertion pipe is disposed at a position away from the terminal end position of the transmitting space of the waveguide by a distance of $(2n-1)/4 \cdot \lambda$ (n: natural number, $\lambda$: guide wavelength).

According to this embodiment, since the coated wire is always located on an anti node of microwave in the electric field, the microwave is efficiently converted into the TEM wave. Therefore, the electric discharge on the tip end of the coated wire becomes great and a speed of the wire process is increased.

In a preferred embodiment of the invention, the wire insertion pipe is made of a dielectric material.

According to this embodiment, the wire insertion pipe is heated by loss of electromagnetic wave in the dielectric. Therefore, the wire recycling process or the wire cross-linking process is facilitated by the heat of the wire insertion pipe.

In a preferred embodiment of the invention, the coated wire, which is composed of a coating insulator and an electric conductor, is not cross-linked and the coating insulator loosely covers an outer periphery of the electric conductor.

According to this embodiment, in a case that the wire processing apparatus is applied to wire cross-linking process, after microwave is launched into the inside of the waveguide, the coated wire is inserted in to the wire insertion pipe. Thereby, the coated wire is cross-linked by high frequency heat and a coating insulator is adhered well to an electric conductor by heat shrinking.

In a preferred embodiment of the invention, the interior of the wire insertion pipe is in hydrogen gas atmosphere.

According to this embodiment, the coating insulator is mainly decomposed into hydrogen and ethylene gas.

In a preferred embodiment of the invention, the interior of the wire insertion pipe is in atmospheric atmosphere.

According to this embodiment, the coating insulator is burned and decomposed. In addition, the interior of the wire insertion pipe may merely be exposed to atmosphere.

To achieve the above object, there is provided a wire processing method of recycling a coated wire composed of a coating insulator and an electric conductor by means of a microwave generator, a waveguide connected to the microwave generator and a wire insertion pipe disposed in a transmitting space of the waveguide, the method comprising the steps of inserting a tip end of the coated wire into the wire insertion pipe, disposing the coated wire such that the tip end thereof is located at a predetermined position in the wire insertion pipe, launching microwave to the transmitting space of the waveguide by means of the microwave generator, separating the tip end of the coated wire into the decomposed coating insulator and the molten electric conductor, and recovering the electric conductor in a state suitable for recycling it, and sending a new tip end of the coated wire sequentially such that the tip end is always located in the predetermined position in the wire insertion pipe whenever the tip end is disappeared.

According to this invention, the electric conductor of the coated wire functions as an interior electric conductor of the coaxial pipe structure to convert the microwave into TEM wave thereon. Since electric discharge is generated on the tip end of the coated wire by the electric field of TEM wave, the coating insulator is decomposed and electric conductor is melted. Therefore, the coating insulator and the electric conductor can be separated from each other, and at least the electric conductor can be recovered in a state suitable for recycling it. Further, the coated wire is sequentially sent such that the tip end of the coated wire is located in a predetermined position within the wire insertion pipe, which may carry out continuous wire processing.

In a preferred embodiment of the invention, the interior of the wire insertion pipe is in hydrogen gas atmosphere.

According to this embodiment, the coating insulator is mainly decomposed into hydrogen and ethylene gas.

In a preferred embodiment of the invention, the interior of the wire insertion pipe is in atmospheric atmosphere.

According to this embodiment, the coating insulator is burned and decomposed. In addition, the interior of the wire insertion pipe may merely be exposed to atmosphere.

To achieve the above object, there is provided a wire processing method of cross-linking a coated wire composed of a coating insulator and an electric conductor by means of a microwave generator, a waveguide connected to the microwave generator and a wire insertion pipe disposed in a transmitting space of the waveguide, the method comprising the steps of launching microwave to the transmitting space of the waveguide by means of the microwave generator, inserting the coated wire into the wire insertion pipe sequentially and cross-linking the coated wire and adhering well the coating insulator to the electric conductor.

According to this invention, the electric conductor of the coated wire functions as an interior electric conductor of a coaxial pipe structure to convert the microwave into TEM wave thereon. By an electric field of the TEM wave, current flows into the electric conductor to occur Joule effect thereon. This heats the coating insulator of the coated wire W from inside thereof, which may cross-link the coated wire and adhere well the coating insulator to the electric conductor by heat shrinking. Therefore, since the wire processing apparatus can be only composed of the microwave generator, the guidewave and the wire insertion pipe, it is possible to form the wire processing apparatus into more compact size. Further, by sending sequentially the coated wire, wire cross-linking process may be continuously carried out.

In a preferred embodiment of the invention, the wire processing method further comprises the step of moving a short plunger disposed in a terminal end position of the transmitting space of the waveguide so as to locate the wire insertion pipe at a position away from the terminal end position of the transmitting space of the waveguide by a distance of $(2n-1)/4 \cdot \lambda$ (n: natural number, $\lambda$: guide wavelength), before the step of launching microwave.

According to this embodiment, since the coated wire is located on an antinode of microwave in the electric field, the microwave is efficiently converted into the TEM wave. Therefore, the electric discharge in the tip end of the coated wire becomes great, and a speed of the wire processing is increased.

In a preferred embodiment of the invention, the wire insertion pipe is made of a dielectric material.

According to this embodiment, the wire insertion pipe is heated by loss of electromagnetic wave in the dielectric. Therefore, the wire recycling process or the wire cross-linking process is facilitated by the heat of the wire insertion pipe.

DESCRIPTION OF THE PREFERRED EMBODIMENTS

First Embodiment

Figure 1:
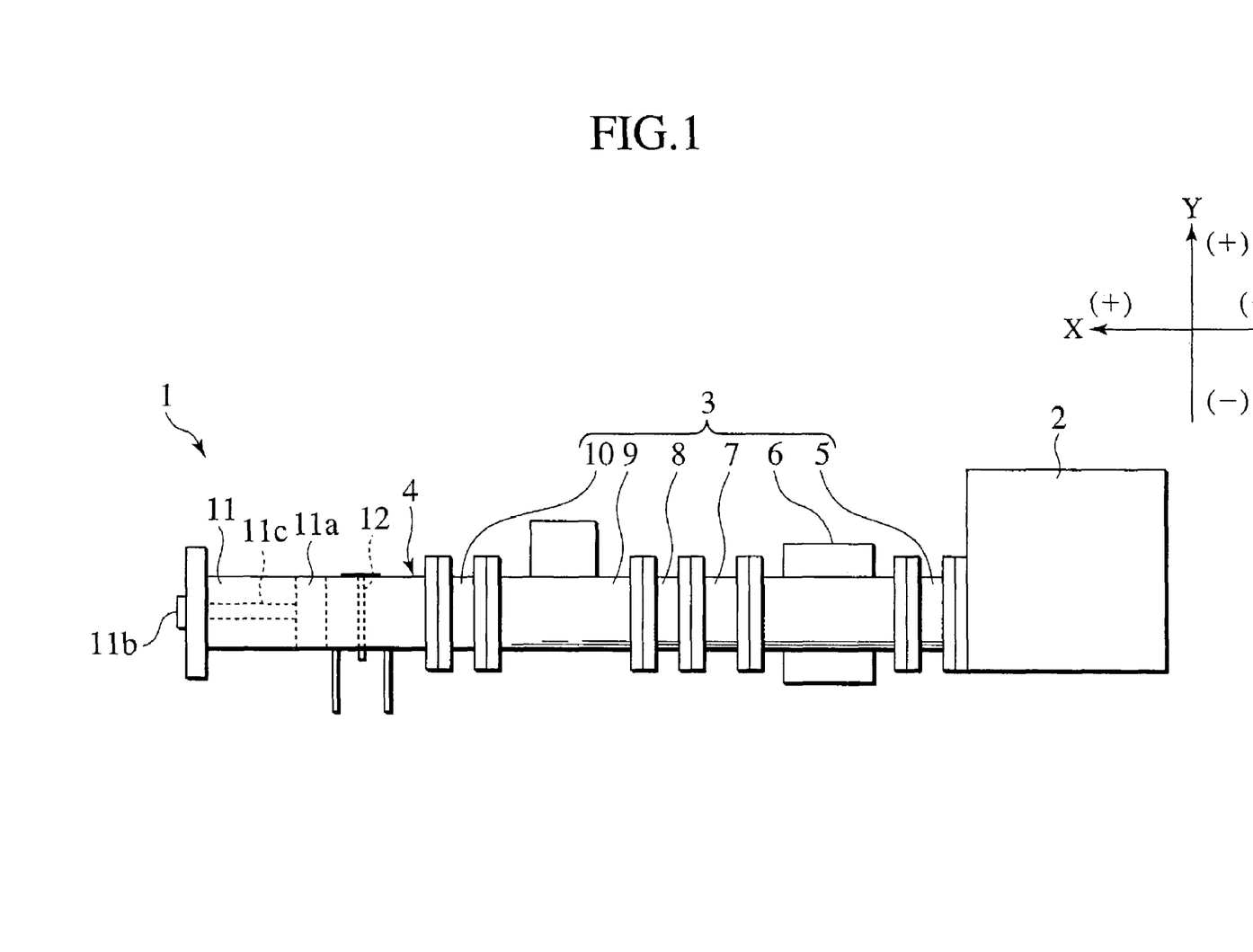
FIG. 1 is a schematic diagram showing a structure of a wire processing apparatus according to a first embodiment in the present invention.

As shown in FIG. 1, a wire processing apparatus 1 is composed of a microwave generator 2 for generating microwave, a microwave transmitter 3 for transmitting microwave generated by the microwave generator 2, and a waveguide coaxial converter 4 for introducing the microwave transmitted by the microwave transmitter 3 and propagating the introduced microwave into an inner space thereof.

The microwave transmitter 3 is constituted by connecting a first direction coupler 5, an isolator 6, a second direction coupler 7, a transformer 8, an automatic matching device 9 and a transformer 10 in this order from a side of incident of microwave. Based on this structure, the microwave transmitter 3 transmits microwave toward the waveguide coaxial converter 4 with H01 wave (TE01 wave) without generating reflected wave.

Figure 2:
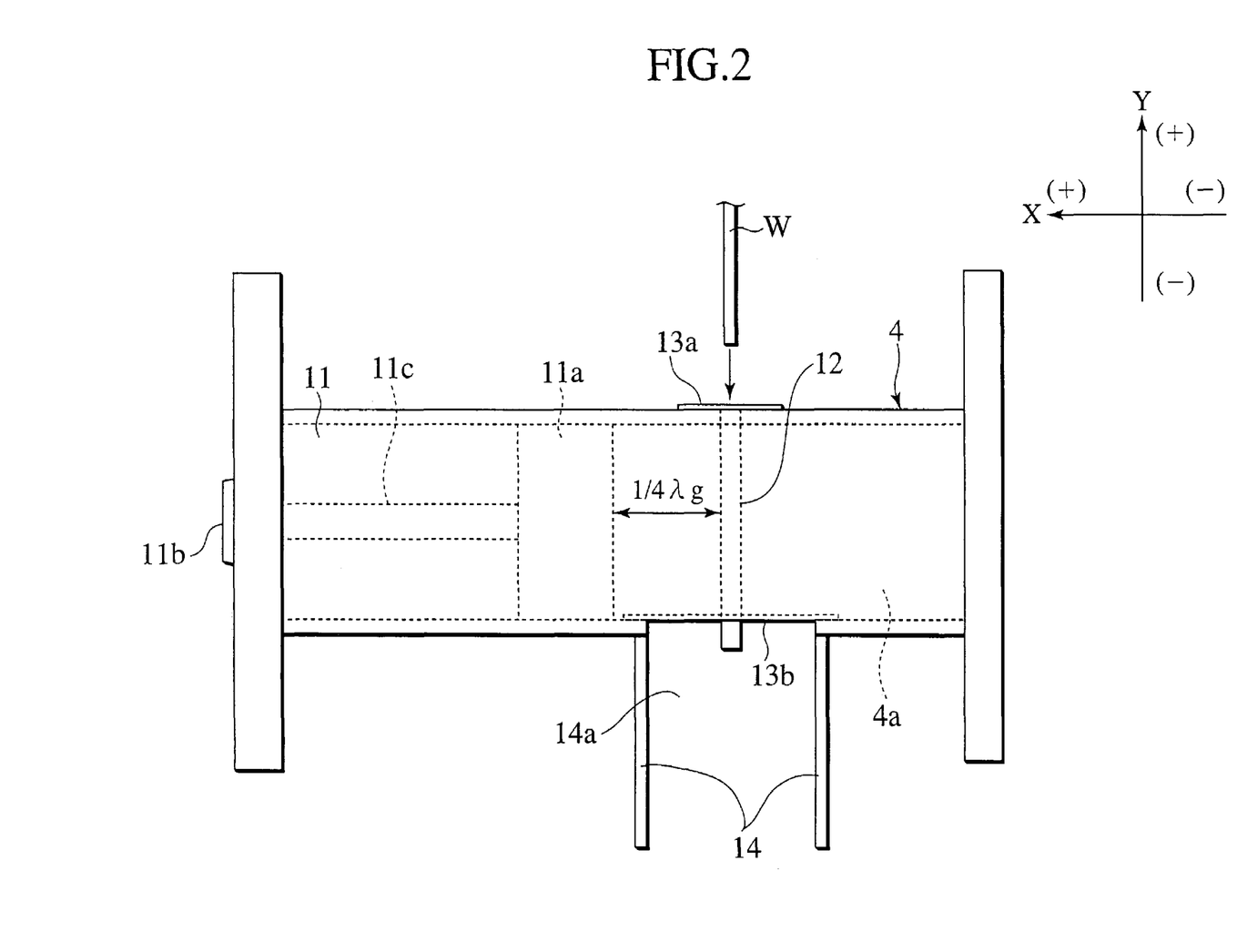
FIG. 2 is a diagram showing a structure of a waveguide coaxial converter of the wire processing apparatus according to the first embodiment in the present invention.

As shown in FIG. 2, the waveguide coaxial converter 4 includes a short plunger 11 on the terminal end side of a transmitting space 4a therein. The short plunger 11 has a movable plate 11a, a rod 11c connected to the movable plate 11a and a fine adjuster 11b adjusting a length of the rod 11c. By adjusting the length of the rod 11c by means of the fine adjuster 11b to change a position of the movable plate 11a, a position of the terminal end of the transmitting space 4a can be moved to a desired position. The movable plate 11a is made of aluminum or copper, and a rod 11c is made of heat-resistant resin. The waveguide coaxial converter 4 is formed into a rectangular shape. Moreover, a wire insertion pipe 12 penetrates through the waveguide coaxial converter 4. The wire insertion pipe 12 is disposed at a position away from a position of the movable plate 11a (a position of the terminal end of the transmitting space 4a) by a distance of $1/4 \cdot \lambda g$ ($\lambda g$: guide wavelength) toward a direction opposite from the terminal end side of the transmitting space 4a (−X axial direction).

Figure 3:
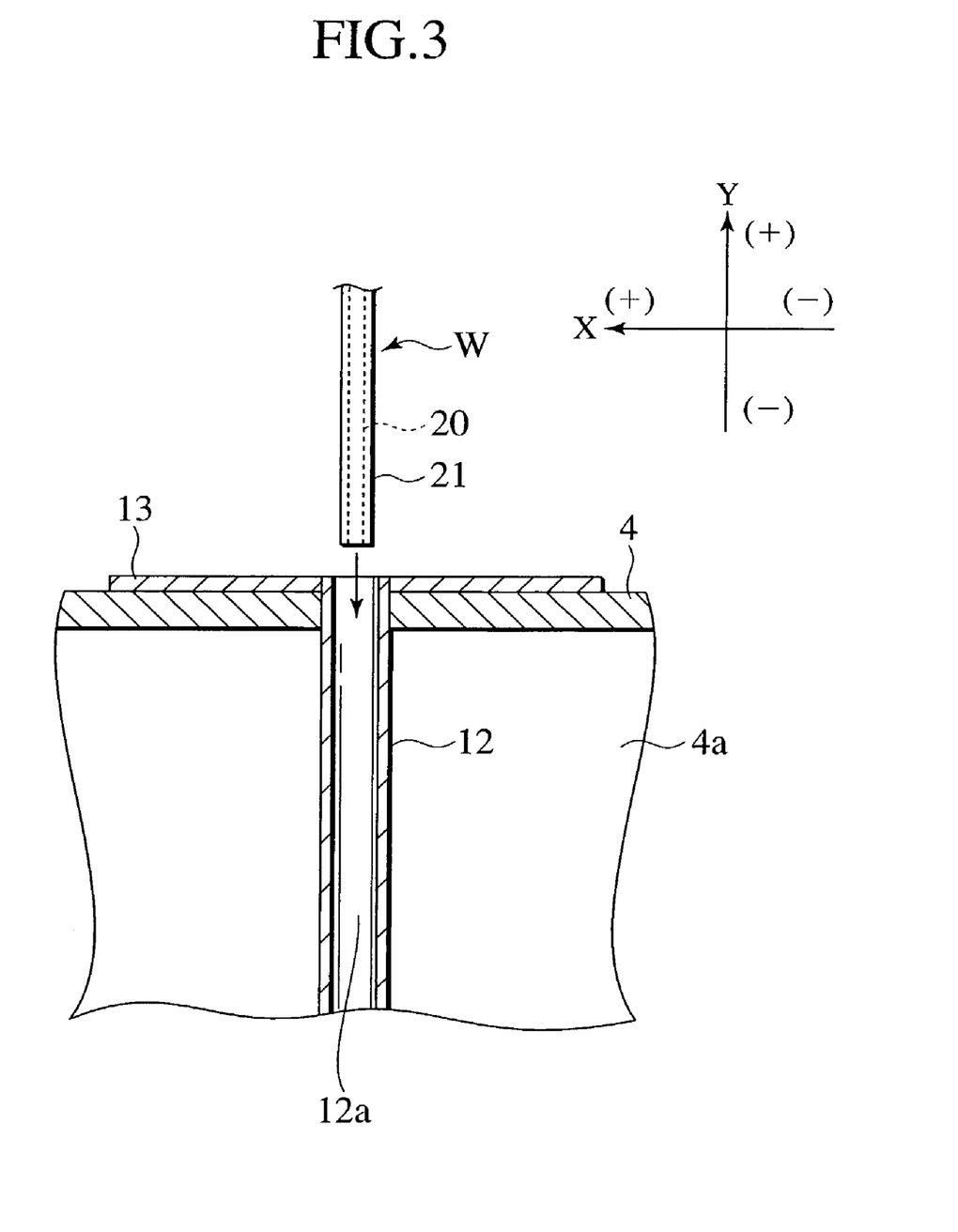
FIG. 3 is an enlarged sectional view of an essential portion of the waveguide coaxial converter according to the first embodiment in the present invention.

The wire insertion pipe 12 is fixed to the waveguide coaxial converter 4 without gap by upper and lower flanges 13a and 13b of copper plate types disposed upper and lower positions of the waveguide coaxial converter 4 respectively. A branched body 14 is connected to lower position of the waveguide coaxial converter 4 in order to introduce a molten electric conductor to a recover portion (not shown). A branched space 14a is separated from the transmitting space 4a by the lower flange 13b. The wire insertion pipe 12 projects from the lower flange 13b in the branched space 14a. As shown in FIG. 3, a coated wire W, which is composed of a linear electric conductor 20 and a coating insulator 21 covering an outer periphery of the electric conductor 20, is inserted into an interior 12a of the wire insertion pipe 12 from above in order to separate the coated wire W into the electric conductor 20 and the coating insulator 21. The wire insertion pipe 12 is made of a dielectric such as glass (e.g., Pyrex glass), quartz and ceramic, and the interior 12a is in hydrogen atmosphere.

Next, a wire recycling operation of the wire processing apparatus 1 will be explained. The coated wire W is inserted into the wire insertion pipe 12 from above, and a tip end of the coated wire W is disposed at a position away from a portion connecting an aperture of the wire insertion pipe 12 to upper portion of the waveguide coaxial converter 4 by a distance of $1/4 \cdot \lambda$ (about 30 mm in this embodiment, $\lambda$ represents a microwave length) in −Y axial direction. Thereafter, if microwave is launched into the transmitting space 4a of the waveguide coaxial converter 4, the electric conductor 20 of the coated wire W functions as an interior electric conductor of a coaxial pipe structure to convert the microwave into TEM wave thereon. Electric discharge is generated on the tip end of the coated wire W by an electric field of the TEM wave, which decomposes the coating insulator 21 and melts the electric conductor 20. The molten electric conductor 20 runs down into the branched space 14a. If the tip end of the coated wire W which is located in the wire insertion pipe 12 is decomposed and melted by electric discharge, a new tip end of the coated electric wire W is sent such that the new tip end is disposed at a position away from the connecting portion by a distance of $1/4 \cdot \lambda$ in the −Y axial direction. The sending operation of the tip end of the coated wire W is sequentially carried out in this manner. By the above operation, the coating insulator 21 and the electric conductor 20 can be separated from each other, and at least the electric conductor 20 can be recovered in a state suitable for recycling it. Therefore, it is possible to efficiently separate the coated wire W into the coating insulator 21 and the electric conductor 20 simultaneously and recover the electric conductor 20 in a state suitable for recycling it.

As described above, by sequentially sending the coated wire W such that the tip end of the coated wire W is located at a predetermined position in the wire insertion pipe 12, wire recycling process is continuously carried out. Further, in this system, if the wire processing apparatus 1 has at least the microwave generator 2 and the waveguide coaxial converter 4 in which a space for accommodating the tip end of the coated wire W is secured, the coated wire W can be separated into the decomposed coating insulator 21 and the molten electric conductor 20 and the electric conductor 20 can be recovered in a state suitable for recycling it. Therefore, it is possible to form the wire processing system 1 into more compact size.

As shown FIG. 2, the wire insertion pipe 12 is disposed in a position away from a position of the movable plate 11a, which is a terminal end of the transmitting space 4a, by a distance of $1/4 \cdot \lambda g$ in the −X axial direction. Thereby, since the coated wire W is located on an antinode of the microwave in the electric field, the microwave is efficiently converted into the TEM wave on the electric conductor 20 in the wire insertion pipe 12. Therefore, a large quantity of the electric discharge occurs on the tip end of the coated wire W, which increases a speed of the wire recycling process so as to swiftly decompose the coating insulator 21 and melt the electric conductor 20.

In this embodiment, since the wire insertion pipe 12 is made of dielectric, the wire insertion pipe 12 is heated by loss of electromagnetic wave in the dielectric. Therefore, the decomposition of the coating insulator 21 and the melting of the electric conductor 20 are facilitated by the heat of the wire insertion pipe 12.

In this embodiment, since the interior 12a of the wire insertion pipe 12 is in hydrogen gas atmosphere, the coating insulator 21 is decomposed mainly into hydrogen and ethylene gas. Therefore, the coating insulator 21 can be recovered mainly as hydrogen and ethylene gas without oxidation-reduction reaction. In addition, the electric conductor 20 is recovered as molten copper which can be easily formed into a desired stock shape.

As a modification of the above embodiment, the interior 12a of the wire insertion pipe 12 may be in an atmospheric atmosphere. In the case that the interior 12a is in atmospheric atmosphere, since the coating insulator 21 is burned and decomposed, only the electric conductor 20 can be recovered from the coated wire W. In addition, the electric conductor 20 is recovered as molten copper which can be easily formed into a desired stock shape. Further, since the interior 12a only needs to face directly the aperture of the interior 12a to atmosphere, it is possible to form the wire processing apparatus 1 into more simply and more compact structure as compared with the case that the interior 12a is in hydrogen atmosphere.

As shown FIG. 2, the terminal end of the transmitting space 4a in the waveguide coaxial converter 4 is in a position of the movable plate 11a. Therefore, by adjusting the length of a rod 11c by means of a fine adjuster 11b to change a position of a movable plate 11a, the wire insertion pipe 12 can be easily disposed to a position away from the movable plate 11a by a distance of $\frac{1}{4}\cdot\lambda g$.

Although the wire insertion pipe 12 is disposed at a position away from the movable plate 11a by a distance of $\frac{1}{4}\cdot\lambda g$ in this embodiment, the wire insertion pipe 12 may be disposed at a position away from the movable plate 11a by a distance of $(2n-1)/4\cdot\lambda g$ (n: natural number). At this position also, since the coated wire W can be located on an antinode of microwave in the electric field, the microwave can be efficiently converted into TEM wave.

Moreover, although the waveguide coaxial converter 4 is formed into a rectangular shape in this embodiment, the waveguide coaxial converter 4 may be formed into a cylindrical shape or the like.

Finally, although the microwave transmitter 3 transmits microwave in a form of H01 wave (TE01 wave) in this embodiment, the microwave may be transmitted in a form of H wave (TE wave) or E wave (TM wave) other than H01 wave (TE01 wave). A transmitting state of microwave is appropriately determined according to a mode of a microwave transmitting path.

Second Embodiment

Figure 4:
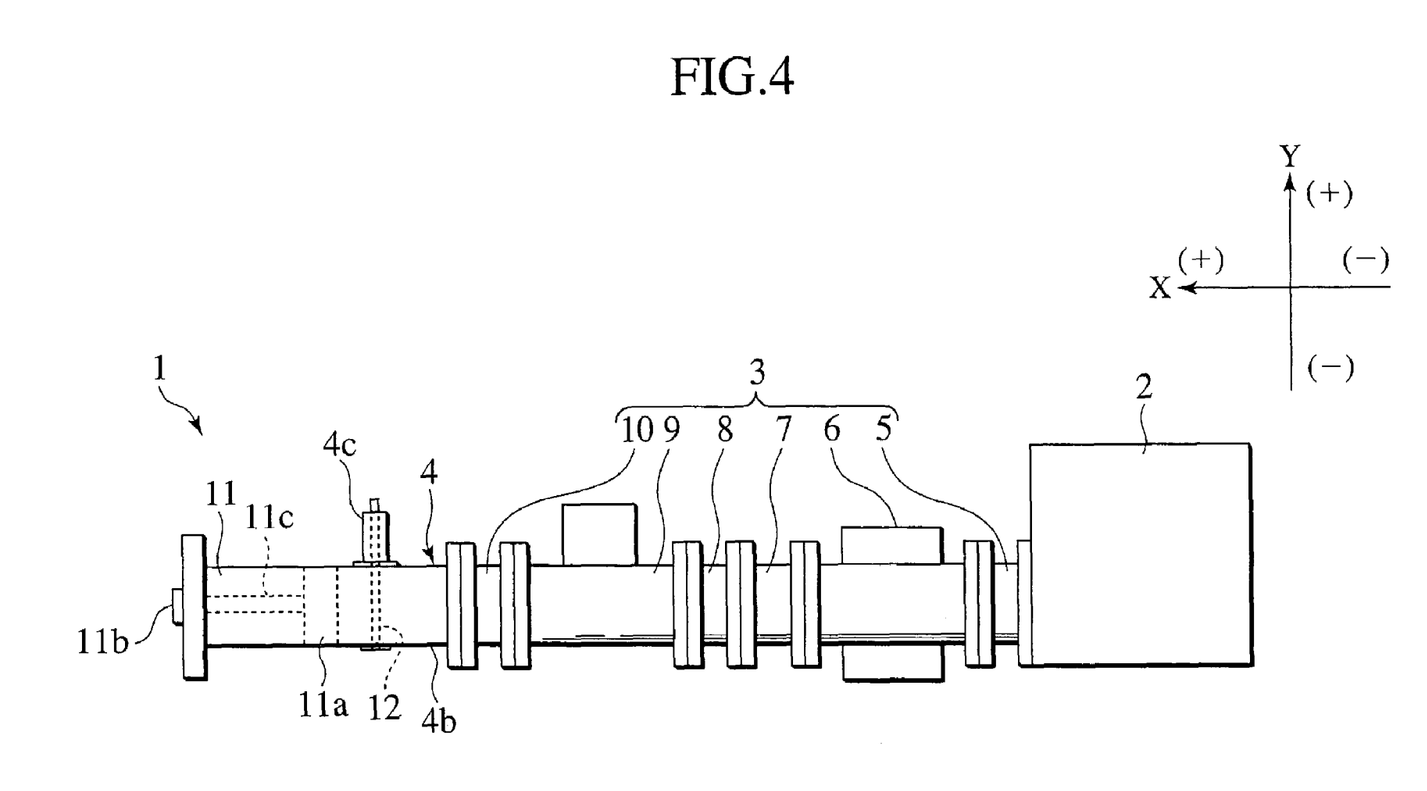
FIG. 4 is a schematic diagram showing a structure of a wire processing apparatus according to a second embodiment in the present invention.
Figure 5:
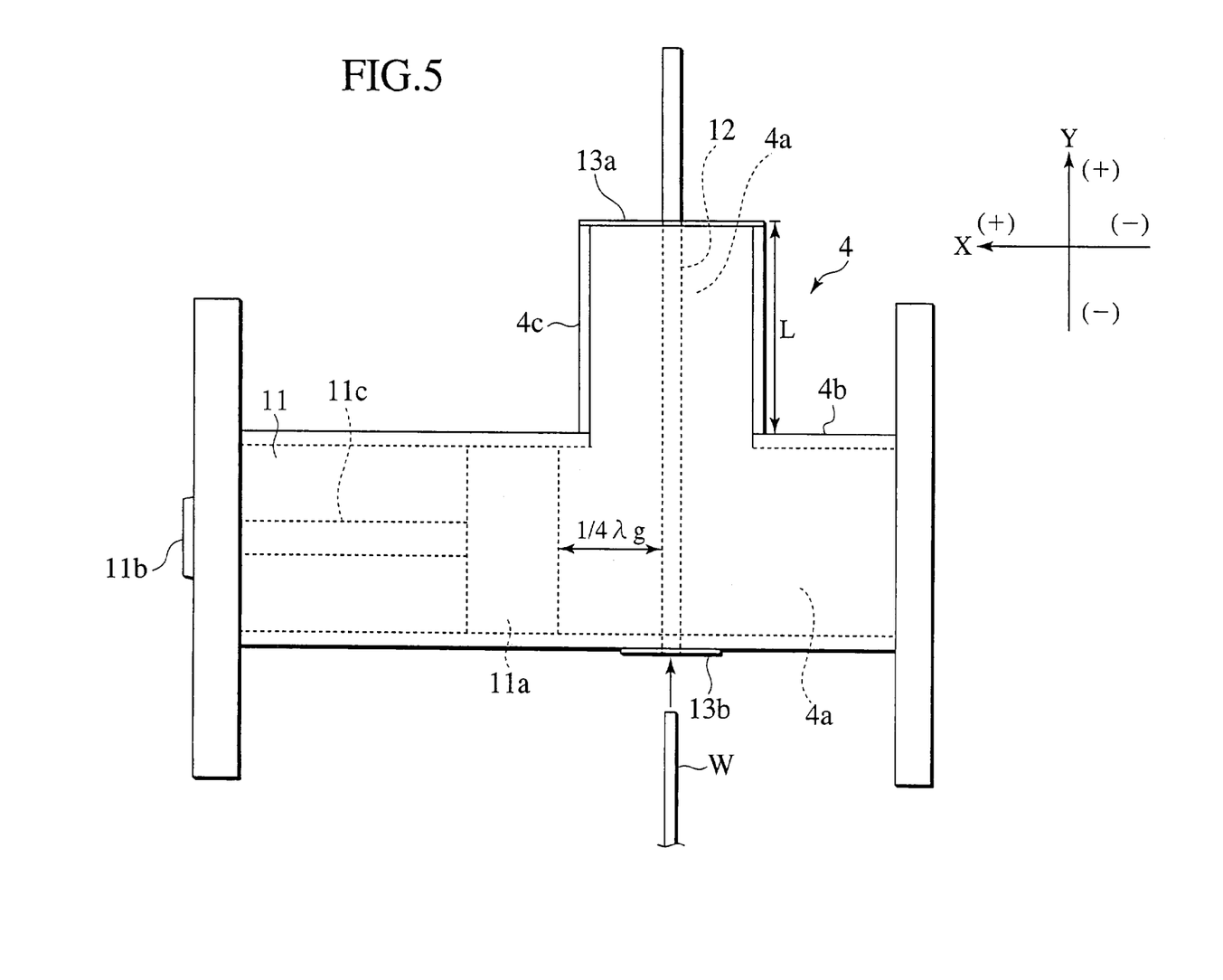
FIG. 5 is a diagram showing a structure of a waveguide coaxial converter of the wire processing apparatus according to the second embodiment in the present invention.
Figure 6:
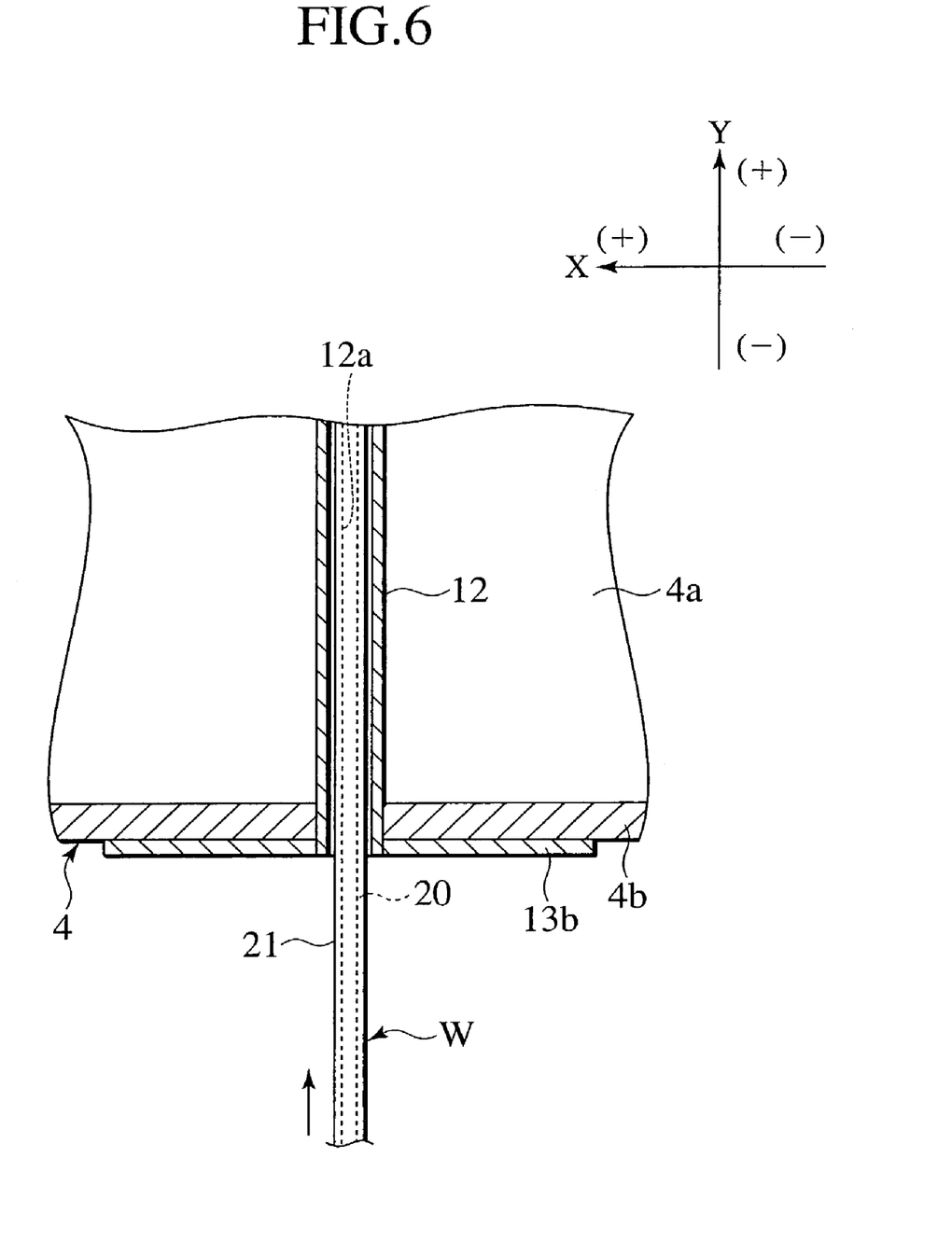
FIG. 6 is an enlarged sectional view of an essential portion of the waveguide coaxial converter according to the second embodiment in the present invention.

It is noted that a wave processing apparatus according to the second embodiment shown in FIGS. 4, 5 and 6 is almost the same as that of the wave processing apparatus according to the first embodiment shown in FIGS. 1, 2 and 3, and like parts are designated by like numbers.

As shown in FIG. 4, a wire processing apparatus 1 is composed of a microwave generator 2 for generating microwave, a microwave transmitter 3 for transmitting microwave generated by the microwave generator 2, and a waveguide coaxial converter 4 for introducing the microwave transmitted by the microwave transmitter 3 and propagating the introduced microwave into an inner space thereof.

The microwave transmitter 3 is constituted by connecting a first direction coupler 5, an isolator 6, a second direction coupler 7, a transformer 8, an automatic matching device 9 and a transformer 10 in this order from a side of incident of microwave. Based on this structure, the microwave transmitter 3 transmits microwave toward the waveguide coaxial converter 4 with H01 wave (TE01 wave) without generating reflected wave.

As shown in FIG. 5, the waveguide coaxial converter 4 includes a short plunger 11 on the terminal end side of a transmitting space 4a in the waveguide coaxial converter 4. The short plunger 11 has a movable plate 11a, a rod 11c connected to the movable plate 11a and a fine adjuster 11b adjusting a length of the rod 11c. By adjusting the length of the rod 11c by means of the fine adjuster 11b to change a position of the movable plate 11a, a position of the terminal end of the transmitting space 4a can be moved to a desired position. The movable plate 11a is made of aluminum or copper, and a rod 11c is made of heat-resistant resin. The waveguide coaxial converter 4 is composed of a main body 4b shaped rectangularity and a branched body 4c connected on the main body 4b. Moreover, a wire insertion pipe 12 penetrates through the main body 4b and the branched body 4c. The wire insertion pipe 12 is disposed at a position away from a position of the movable plate 11a (a position of the terminal end of the transmitting space 4a in the main body 4b) by a distance of $\frac{1}{4}\cdot\lambda g$ ($\lambda g$: guide wavelength) toward a direction opposite from the terminal end side of the transmitting space 4a in the main body 4b ( -X axial direction).

The wire insertion pipe 12 is fixed to the waveguide coaxial converter 4 without gap by upper and lower flanges 13a and 13b of copper plate types disposed upper and lower positions of the waveguide coaxial converter 4 respectively. The upper flange 13a is formed as the terminal end of the transmitting space 4a in the branched body 4c. As shown FIG. 6, a non-cross-link coated wire W, which is composed of a linear electric conductor 20 and a coating insulator 21 covering an outer periphery of the electric conductor 20, is inserted into an interior 12a of the wire insertion pipe 12 from blow. The wire insertion pipe 12 is made of a dielectric such as glass (e.g., Pyrex glass), quartz and ceramic. It is noted that the coating insulator 21 loosely covers the outer periphery of the electric conductor 20 and is not adhered well to the electric conductor 20 in the non-cross-link coated wire W.

Next, a wire cross-linking operation of the wire processing apparatus 1 will be explained. After microwave is launched into the transmitting space 4a in the waveguide coaxial converter 4, the non-cross-link coated wire W is inserted into the wire insertion pipe 12 from below. Thereby, the electric conductor 20 of the non-cross-link coated wire W functions as an interior electric conductor of a coaxial pipe structure to convert the microwave into TEM wave thereon. By an electric field of the TEM wave, current flows into the electric conductor 20 to occur Joule effect thereon. This heats the coating insulator 21 of the non-cross-link coated wire W from inside thereof, which may cross-link the coating insulator 21 and adhere well the coating insulator 21 to the electric conductor 20 by heat shrinking. In this system, if the wire processing apparatus 1 includes at least the microwave generator 2 and the waveguide coaxial converter 4 in which space for accommodating the coated wire W is secured, the high frequency heat can be applied the non-cross-link coated wire to cross-link the coating insulator 21 and adhere well the coating insulator to the electric conductor 20. Therefore, it is possible to form the wire processing apparatus 1 into more compact size. Further, by sending sequentially the non-cross-link coated wire W, wire cross-linking process may be continuously carried out.

As shown FIG. 5, the wire insertion pipe 12 is disposed in a position away from a terminal end of the transmitting space 4a in the main body 4b by a distance of $\frac{1}{4}\cdot\lambda g$ in the -X axial direction. Thereby, since the coated wire W is located on an antinode of the microwave in the electric field, the microwave is efficiently converted into the TEM wave on the electric conductor 20 in the wire insertion pipe 12. Therefore, a large current flows into the electric conductor 20 by generated large electric field, which swiftly heats the coating insulator 21.

In this embodiment, since the wire insertion pipe 12 is made of dielectric, the wire insertion pipe 12 is heated by loss of electromagnetic wave in the dielectric, and the wire insertion pipe 12 heats the non-cross-link coated wire W from outside thereof. Thereby, since the non-cross-link coated wire W is heated from inside and outside thereof, the wire cross-linking process is efficiently carried out.

As shown FIG. 5, the terminal end of the transmitting space 4a in the waveguide coaxial converter 4 is in a position of the movable plate 11a. Therefore, by adjusting the length of the rod 11c by means of a fine adjuster 11b to change a position of a movable plate 11a, the movable plate 11a can be easily disposed to a position away from the movable plate 11a by a distance of $1/4 \cdot \lambda g$.

Although the wire insertion pipe 12 is disposed at a position away from the movable plate 11a by a distance of $1/4 \cdot \lambda g$ in this embodiment, the wire insertion pipe 12 may be disposed at a position away from the movable plate 11a by a distance of $(2n-1)/4 \cdot \lambda g$ (n: natural number). At this position also, since the coated wire W can be located on an antinode of microwave in the electric field, the microwave can be efficiently converted into TEM wave.

In this embodiment, a length L of the branched body 4c (in +Y axial direction) is set to a length not to generate reflected wave in microwave. The length L is set to 62 mm in this embodiment. Therefore, in this embodiment, extending the length L of the branched body 4c every 62 mm allows us to heat the coated wire more efficiently without generating reflected wave. As a result, the extended branched body 4c having the length L of multiple of 62 mm increases the speed of wire cross-linking process.

Moreover, although the main body 4b of the waveguide coaxial converter 4 is formed into a rectangular shape in this embodiment, the main body 4b may be formed into a cylindrical shape or the like.

Finally, although the microwave transmitter 3 transmits microwave in a form of H01 wave (TE01 wave) in this embodiment, the microwave may be transmitted in a form of H wave (TE wave) or E wave (TM wave) other than H01 wave (TE01 wave). A transmitting state of microwave is appropriately determined according to a mode of a microwave transmitting path.

What is claimed is:

1. A wire processing method of cross-linking a coated wire composed of a coating insulator and an electric conductor by means of a microwave generator, a waveguide connected to the microwave generator and a wire insertion pipe disposed in a transmitting space of the waveguide, the method comprising the steps of;

moving a short plunger to locate a terminal end of the transmitting space at a desired position in order to swiftly heat the coated wire with microwaves;

introducing microwaves to the transmitting space of the waveguide by means of the microwave generator;

inserting the coated wire into the wire insertion pipe sequentially; and cross-linking the coated wire and adhering the coating insulator to the electric conductor.

2. The wire processing method according to claim 1, further including moving the short plunger such that the wire insertion pipe is located at a position away from the terminal end of the transmitting space by a distance of $(2n-1)/4*\lambda$ (n: natural number, $\lambda$: guide wavelength).

3. The wire processing method according to claim 1, wherein the wire insertion pipe is made of a dielectric material.

* * * * *

UNITED STATES PATENT AND TRADEMARK OFFICE
CERTIFICATE OF CORRECTION

PATENT NO.       : 7,234,235 B2
APPLICATION NO.  : 10/356595
DATED            : June 26, 2007
INVENTOR(S)      : Tatsuya Kato et al.

It is certified that error appears in the above-identified patent and that said Letters Patent is hereby corrected as shown below:

Claim 1, column 10, line 12, "the steps of;" should read --the steps of:--.

Signed and Sealed this

Twenty-third Day of October, 2007

JON W. DUDAS
*Director of the United States Patent and Trademark Office*